United States Patent
Goh

(10) Patent No.: US 11,208,077 B2
(45) Date of Patent: Dec. 28, 2021

(54) ONE-TOUCH SLIDE ASSEMBLY TYPE WIPER BLADE

(71) Applicant: GOS CO. LTD., Gyeongsangbuk-do (KR)

(72) Inventor: Su Yeun Goh, Gyeongsangbuk-do (KR)

(73) Assignee: GOS CO. LTD., Gyeongsangbak-do (KR)

( * ) Notice: Subject to any disclaimer, the term of this patent is extended or adjusted under 35 U.S.C. 154(b) by 680 days.

(21) Appl. No.: 16/066,728

(22) PCT Filed: Dec. 28, 2015

(86) PCT No.: PCT/KR2015/014302
§ 371 (c)(1),
(2) Date: Oct. 8, 2018

(87) PCT Pub. No.: WO2017/115880
PCT Pub. Date: Jul. 6, 2017

(65) Prior Publication Data
US 2019/0061701 A1 Feb. 28, 2019

(51) Int. Cl.
*B60S 1/40* (2006.01)
*B60S 1/38* (2006.01)

(52) U.S. Cl.
CPC ............ *B60S 1/4009* (2013.01); *B60S 1/381* (2013.01); *B60S 1/387* (2013.01); *B60S 1/4003* (2013.01);
(Continued)

(58) Field of Classification Search
CPC ........ B60S 1/407; B60S 1/4077; B60S 1/387; B60S 1/4003; B60S 1/4009; B60S 1/381;
(Continued)

(56) References Cited

U.S. PATENT DOCUMENTS 4,422,207 A * 12/1983 Maiocco ............... B60S 1/3801
15/250.32
4,445,249 A * 5/1984 Harbison .............. B60S 1/4038
15/250.32
(Continued)

FOREIGN PATENT DOCUMENTS

CN 204488738 U 7/2015
KR 10-2010-0059580 A 6/2010
(Continued)

OTHER PUBLICATIONS

European Search Report for related European Application No. 15912116.9; action dated Jul. 3, 2019; (7 pages).
(Continued)

*Primary Examiner* — Gary K. Graham
(74) *Attorney, Agent, or Firm* — Studebaker & Brackett PC

(57) ABSTRACT

Disclosed is a one-touch slide assembly type wiper blade in which a rail spring is coupled to an upper part of a rubber blade, a base cover is formed, in the longitudinal direction thereof, at the center of the rubber blade including the rail spring, and right and left spoilers are respectively assembled at both right and left parts of the base cover, wherein one or more bracket-shaped grip parts are formed on the bottom surface of the base cover respectively at the front side and the rear side thereof, and then the base cover is slidingly assembled in a state in which bidirectional movement can be freely performed using grip parts, and the right and left positions of the base cover, which is slidingly assembled, are fixed by the right and left spoilers, which are respectively coupled to the both side parts of the base cover.

15 Claims, 28 Drawing Sheets

(52) U.S. Cl.
CPC ............. *B60S 1/4077* (2013.01); *B60S 1/407* (2013.01); *B60S 2001/382* (2013.01); *B60S 2001/3836* (2013.01); *B60S 2001/4022* (2013.01); *B60S 2001/4035* (2013.01); *B60S 2001/4058* (2013.01)

(58) Field of Classification Search
CPC ........ B60S 1/3849; B60S 1/3851; B60S 1/40; B60S 1/4064; B60S 2001/4058; B60S 2001/4035; B60S 2001/382; B60S 2001/3836; B60S 2001/4022
USPC .................. 15/250.201, 250.32, 250.43
See application file for complete search history.

(56) References Cited

U.S. PATENT DOCUMENTS

| | | | | |
|---|---|---|---|---|
| 7,373,688 | B2 * | 5/2008 | Aoyama | B60S 1/381 |
| | | | | 15/250.201 |
| 2006/0026786 | A1 * | 2/2006 | Ku | B60S 1/38 |
| | | | | 15/250.32 |
| 2008/0235896 | A1 | 10/2008 | Cheng | |
| 2011/0056041 | A1 * | 3/2011 | Wu | B60S 1/4019 |
| | | | | 15/250.32 |
| 2013/0139343 | A1 * | 6/2013 | Kim | B60S 1/4006 |
| | | | | 15/250.32 |
| 2013/0227811 | A1 * | 9/2013 | Kim | B60S 1/3848 |
| | | | | 15/250.201 |
| 2015/0175132 | A1 * | 6/2015 | Benner | B60S 1/3879 |
| | | | | 15/250.201 |

FOREIGN PATENT DOCUMENTS

| | | |
|---|---|---|
| KR | 10-2012-0066208 A | 6/2012 |
| KR | 10-1433220 B1 | 8/2014 |
| KR | 10-1170905 B1 | 8/2015 |

OTHER PUBLICATIONS

International Search Report from International Patent Application No. PCT/KR2015/014302 dated Sep. 27, 2016 and English translation of same.
Written Opinion from International Patent Application No. PCT/KR2015/014302 dated Sep. 27, 2016.

* cited by examiner

[A]

[B]

[A]

[B]

[A]

[B]

[A]

[B]

ONE-TOUCH SLIDE ASSEMBLY TYPE WIPER BLADE

CROSS REFERENCE TO RELATED APPLICATIONS

The present application is a National Stage of International Application No. PCT/KR2015/014302, filed on Dec. 28, 2015, the entire content of which is incorporated herein by reference.

TECHNICAL FIELD

The present disclosure relates to a one-touch slide assembly type wiper blade which enables easier and simpler assembly and significant cost reduction by having a base cover coupled to be freely movable with one touch and having the position of the base cover determined by spoilers coupled to both sides of the base cover.

BACKGROUND ART

A conventional wiper blade (or a vehicle wiper device) is a medium for wiping off foreign matter (rainwater, snow, dust, etc.) adhering to a surface of a glass window while rotating (turning) with a predetermined radius according to the operation of a user. The wiper blade is an essential element of a vehicle.

Most widely used types of wiper blades are a tournament type and a flat blade type. In the tournament type, secondaries are respectively connected to both sides of a main primary made of a metal material, and a plurality of lever type yokes (members having no own tension force) operating in a tournament in connection with a joint action of a secondary are provided as an individual oscillation type below each secondary so as to hold a rubber blade and apply uniform pressure to a curved surface of a window while precisely following the curvature of the curved surface of the window.

In the flat blade type, an elastic beam having the same large length as the wiper is constructed as a main frame and a uniform pressurization medium. In addition, since anti-air lift spoilers are provided at an upper side of the elastic beam while a wiper strip is coupled to a lower side, drag acts against wind pressure during high-speed driving. Therefore, the lifting or floating of the flat blade type can be fundamentally prevented.

However, in the tournament type from among the above conventional wipers, the secondaries are respectively connected to both sides of the main primary, a plurality of lever type yokes operating in a tournament in connection with the joint action of a secondary are provided as an individual oscillation type below each secondary, and then a wiper strip is held by the yokes. Therefore, the tournament type can apply uniform pressure to the curved surface of the window and precisely follow the curvature of the curved surface. However, due to the absence of a medium to cope with air pressure, the tournament type is unstable, that is, is easily lifted or floats during high-speed driving. In addition, since the secondaries (two) should be respectively connected to both sides of the main primary (one) and a plurality of lever type yokes operating in a tournament in connection with the joint action of a secondary should be provided as an individual oscillation type below each secondary as described above, elements and assembly and manufacturing processes are very complicated.

In the case of the conventional flat blade, drag against air resistance acts due to the presence of the anti-air lift spoilers. Therefore, compared with the tournament type, the flat blade type is not lifted nor floats even during high-speed driving. However, since a clamp (a part for coupling an adapter) coupled to an upper center of a rail spring is made of a metal material and is fixed (non-detachable) through a press pressurization process, the manufacturing process is complicated, and a loss of assembly process and cost is large. Also, it is impossible to detach the clamp when necessary. Further, when the spring rail is manufactured, a long groove needs to be formed by a press or laser machining method to couple an upper end of a rubber blade. In addition, when the anti-air lift spoilers are assembled, caps need to be unnecessarily attached to both ends of the anti-air lift spoilers for finishing purposes. That is, since a considerable amount of time and money are wasted for manufacture and assembly, improvement is urgently required.

In particular, in the conventional flat blade wiper, when the clamp (the part for coupling the adapter) is installed at the longitudinal center of the wiper, the spoilers are coupled to left and right sides of the clamp in a state where the clamp is completely fixed (by pressure) to be unmovable to both sides of the rail spring or both ends of the rubber blade including the rail spring. Therefore, unnecessarily many processes and costs are required to manufacture and assemble the clamp at the center, causing price competitiveness of products to drop significantly.

DISCLOSURE

Technical Problem

Aspects of the present disclosure provide a novel one-touch slide assembly type wiper blade which can be assembled more quickly and easily and enables a significant reduction in manufacturing and assembly processes as well as time and cost by having a base cover coupled to be freely movable with one touch and then having bidirectional spoilers coupled to both sides of the base cover to determine the position of the base cover.

Technical Solution

According to an aspect of the present disclosure, there is provided a vehicle wiper device in which rail springs 20 are coupled to an upper side of a rubber blade 100, a base cover 130 is disposed at a longitudinal center of the rubber blade 100 including the rail springs 120, and left and right spoilers 140 are assembled on left and right sides of the base cover 130, respectively, wherein the base cover 130 includes one or more " ⌐ "-shaped grip parts 135 formed on a bottom surface of each of a front side and a rear side of the base cover 130 and is slidingly assembled using the grip parts 135 to be freely movable in both directions; and the left and right spoilers 140 are respectively slidingly assembled on both sides of the slidingly assembled base cover 130 to determine the position of the base cover 130.

Advantageous Effects

In the above one-touch slide assembly type wiper blade of the present disclosure, when the base cover 130 is assembled at the center of the rubber blade 110 including the rail springs 120, it may not be coupled with difficulty by a pressurization process using a press. Instead, the base cover 130 may be very easily inserted into an upper head 111 of the rubber blade 110 by a one-touch sliding operation and then maintain a stable grip state. The left and right spoilers may also be coupled to the rubber blade 110 including the rail springs 120 in both directions with respect to the base cover 130 by a quick and simple one-touch sliding operation and then maintain a grip state. In particular, since the organic coupling (assembly) relationship between the base cover 130 and the left and right spoilers can be completed only by each simple one-touch assembling operation, the speed and convenience of wiper manufacture and assembly can be greatly increased, and costs can be sharply reduced. Thus, the present disclosure is expected to provide many benefits.

MODE FOR INVENTION

Figure 1:
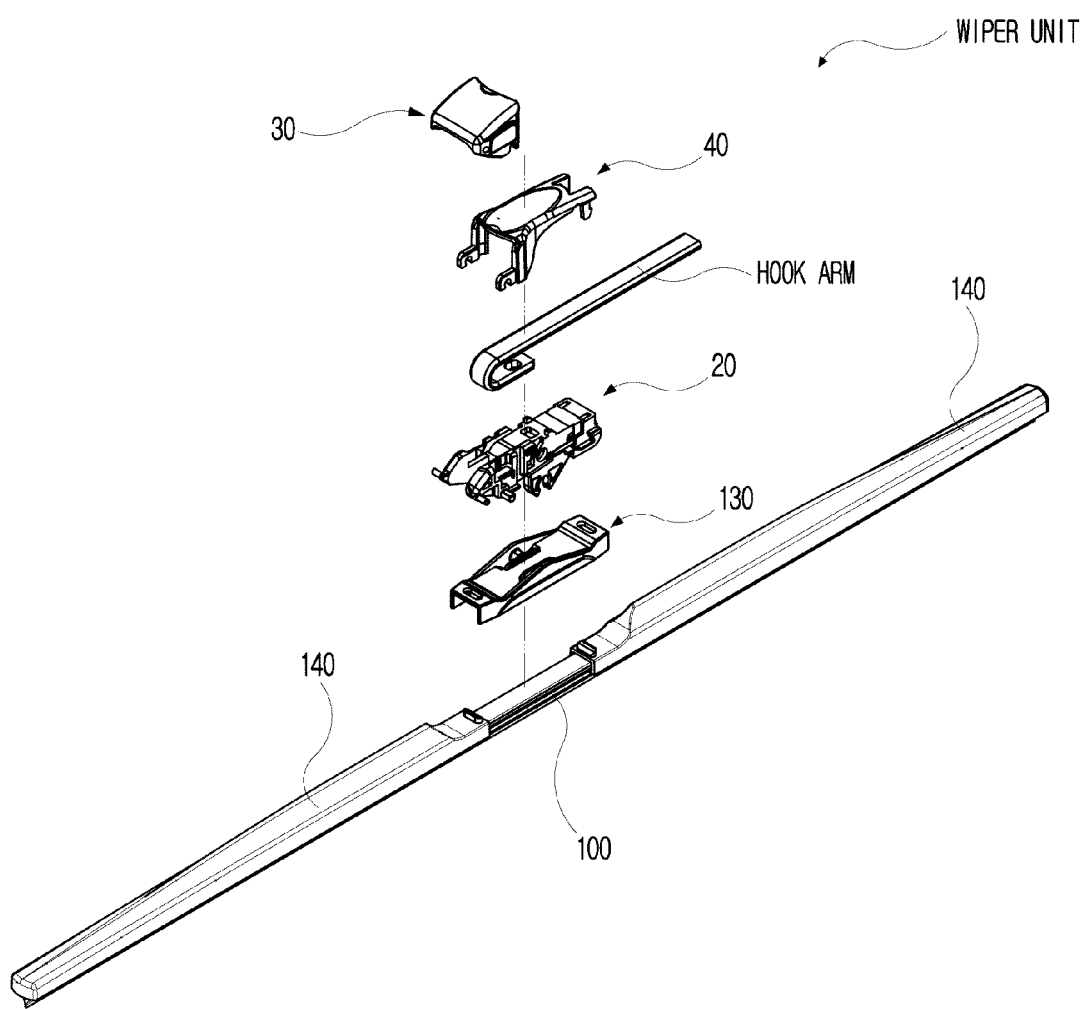
FIG. 1 is a perspective view of an exemplary state of the present disclosure.
Figure 2:
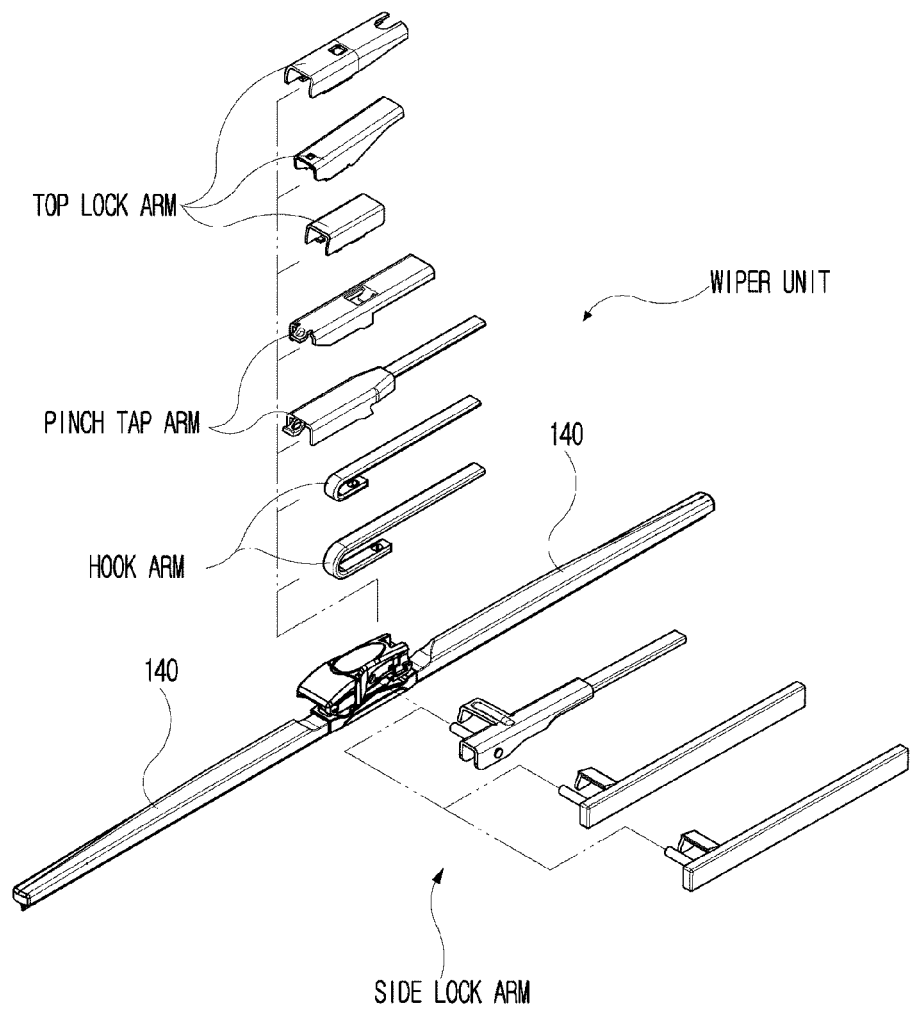
FIG. 2 is an exemplary view showing an application state of the present disclosure.
Figure 3:
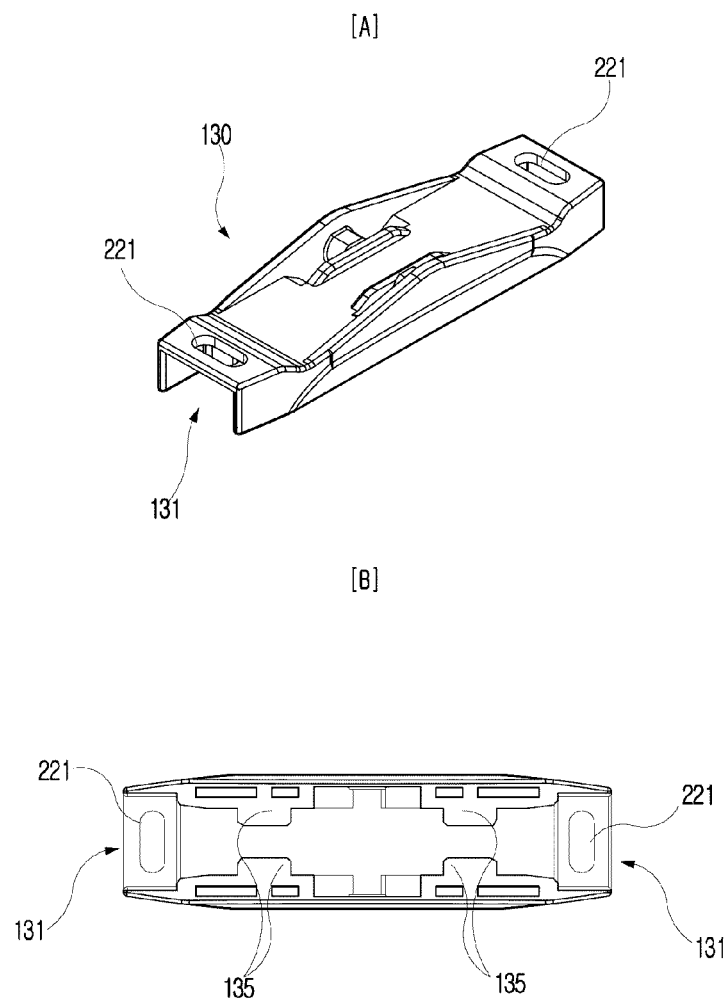
FIG. 3 is a perspective view and a bottom view of a base cover of the present disclosure.
Figure 4:
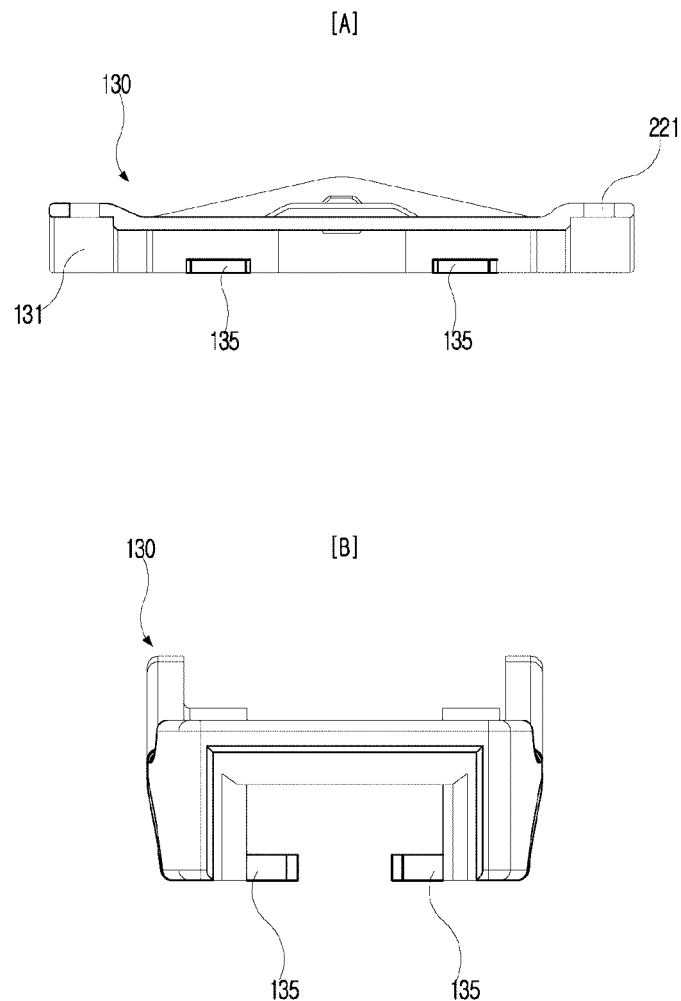
FIG. 4 is a cross-sectional view and a side view of the base cover of the present disclosure.
Figure 5:
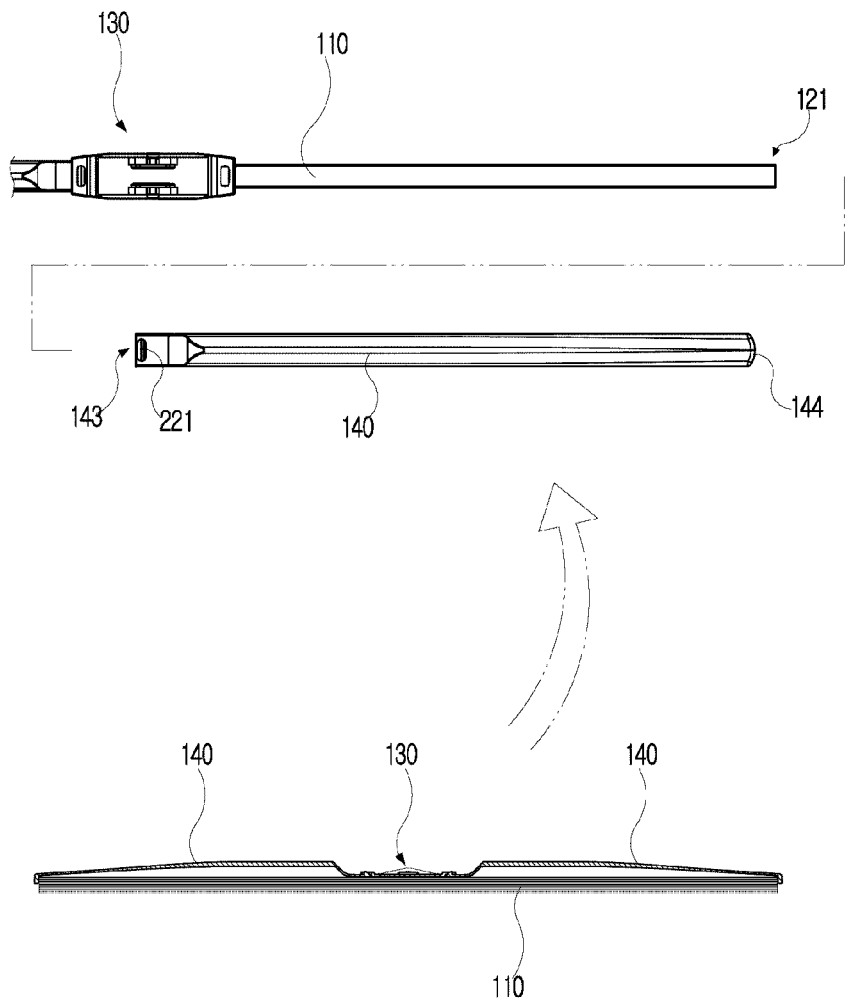
FIG. 5 is an exemplary assembly view and a cross-sectional view of the base cover and left and right spoilers of the present disclosure.
Figure 6:
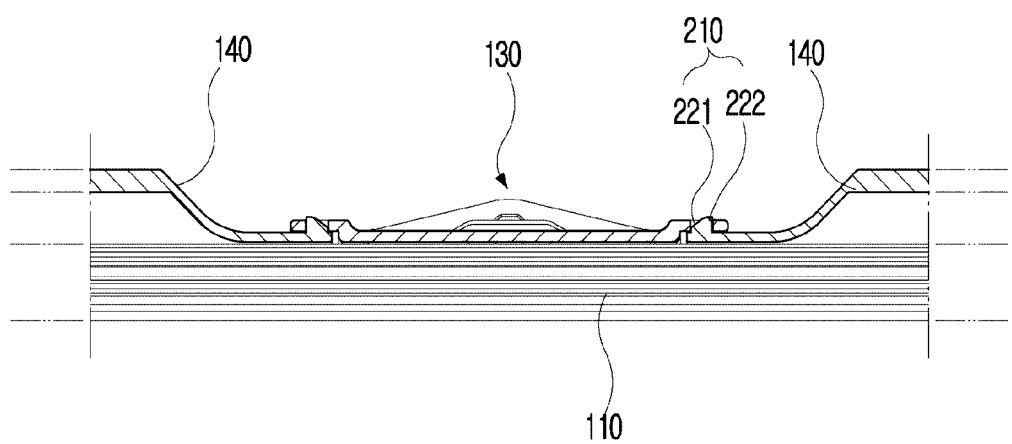
FIG. 6 is an exemplary enlarged cross-sectional view showing coupling portions of the base cover of the present disclosure.
Figure 7:
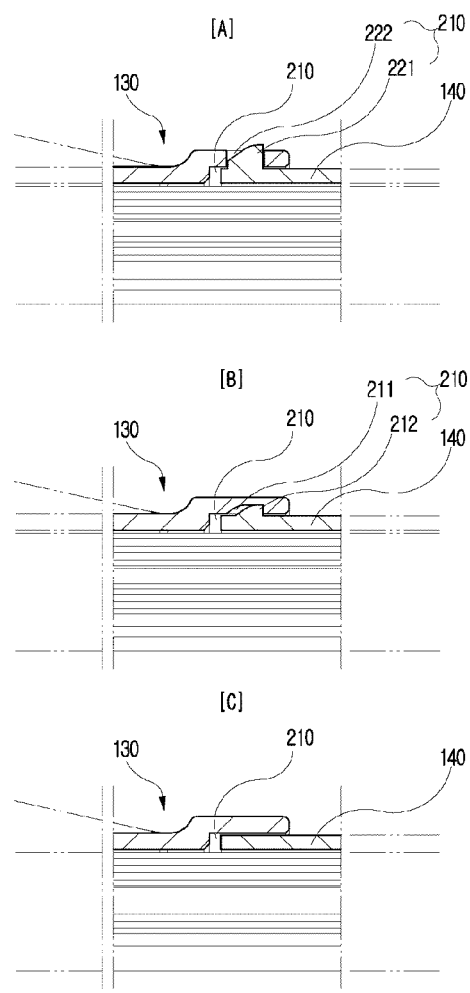
FIG. 7 is an exemplary cross-sectional view and application state diagram showing the coupling of a connection groove of the base cover of the present disclosure.
Figure 8:
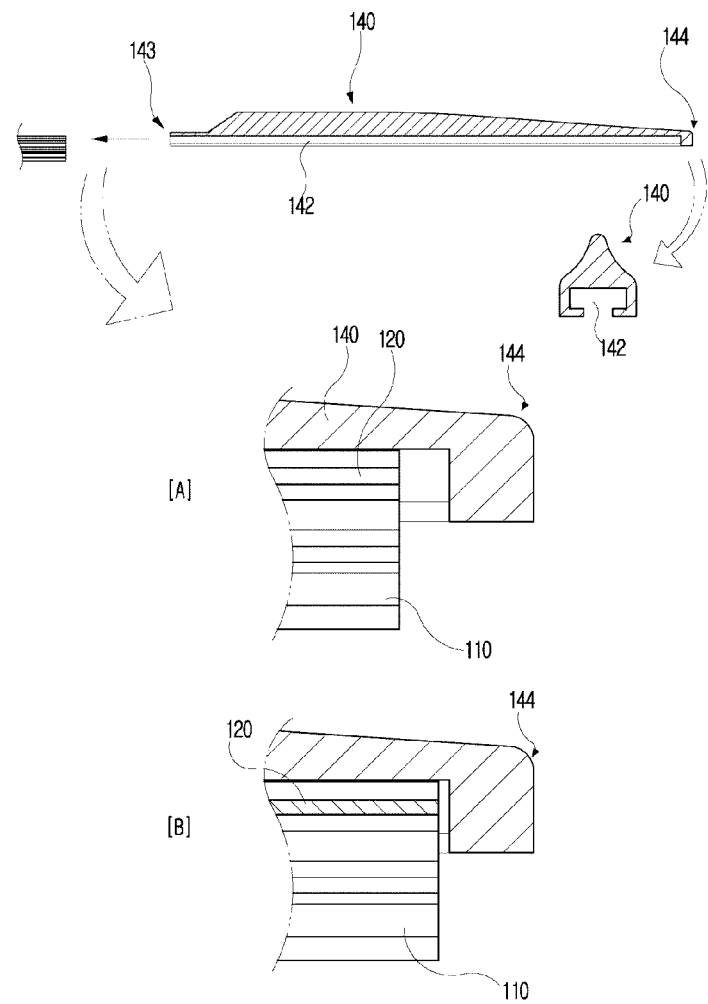
FIG. 8 is an exemplary cross-sectional view and application state diagram showing the coupling of a rail end joining groove of the present disclosure.
Figure 9:
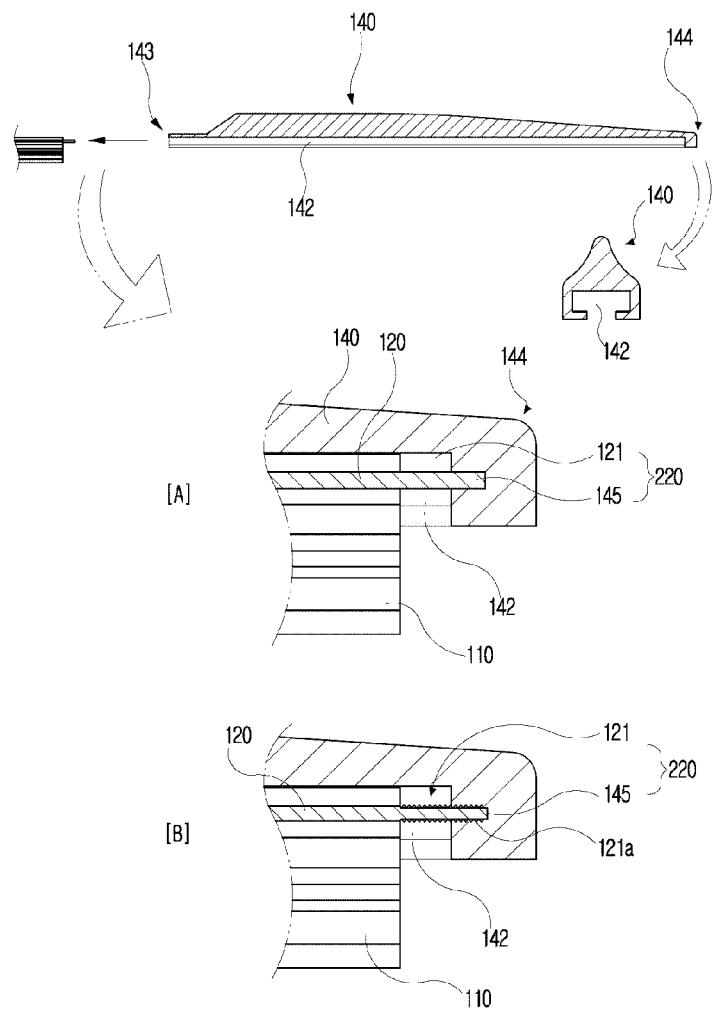
FIG. 9 is another exemplary cross-sectional view and application state diagram showing the coupling of a rail end joining groove of the present invention.
Figure 10:
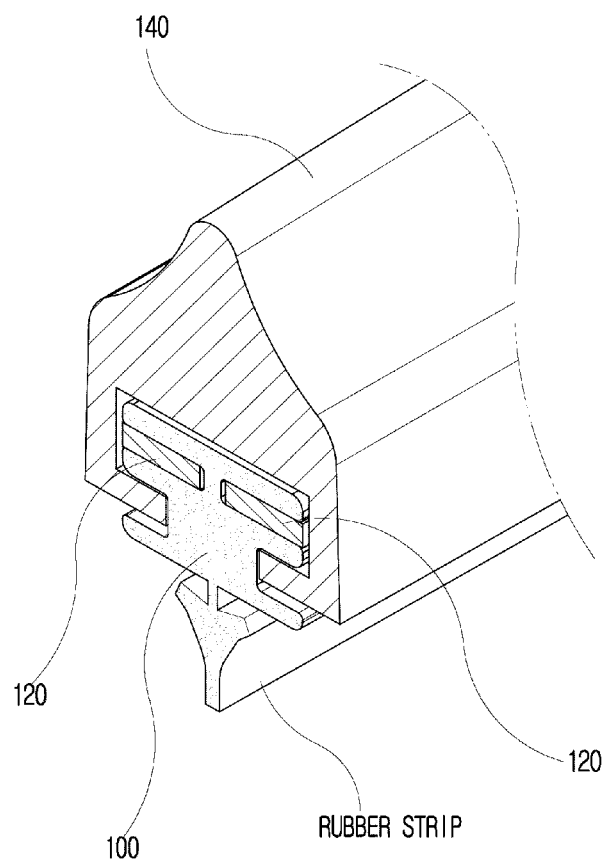
FIG. 10 is an exemplary coupled cross-sectional view of a spoiler and a rubber blade of the present disclosure.
Figure 11:
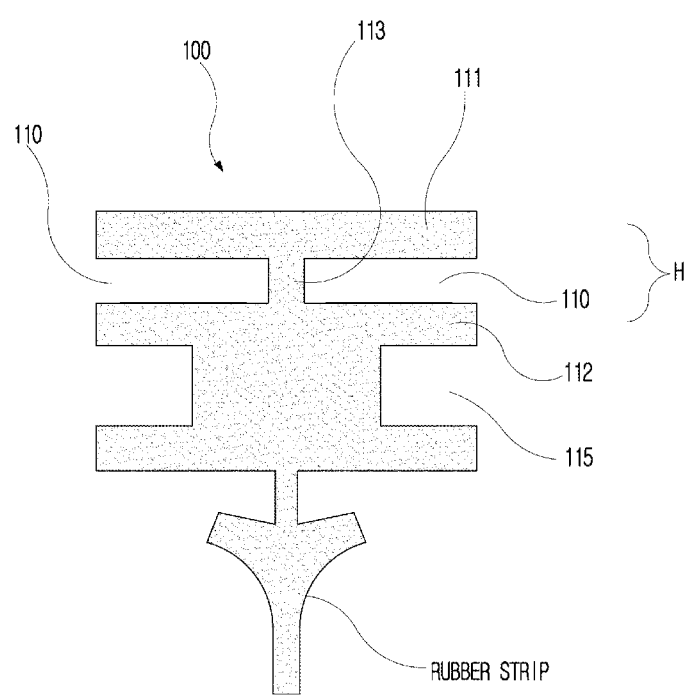
FIG. 11 is an exemplary enlarged cross-sectional view of the rubber blade of the present disclosure.
Figure 12:
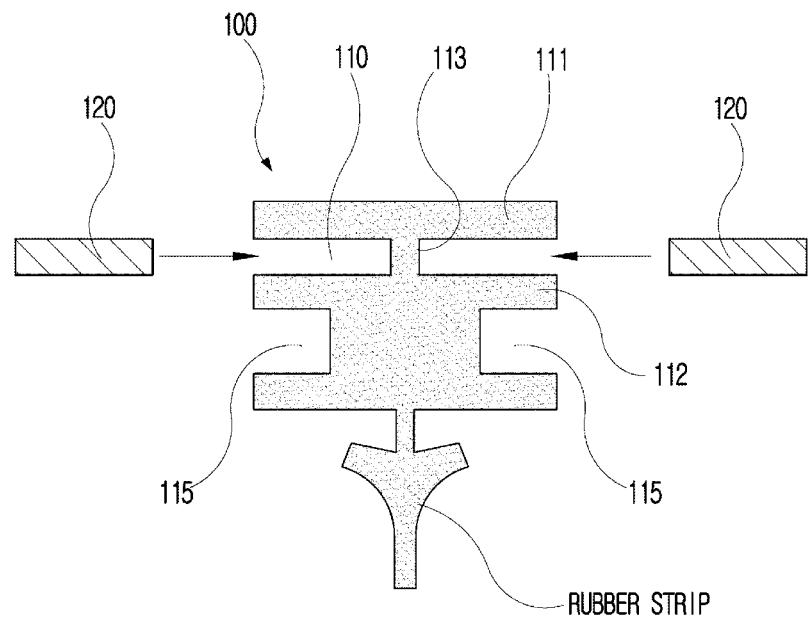
FIG. 12 is a state diagram showing the coupling of the rubber blade and springs of the present disclosure.
Figure 13:
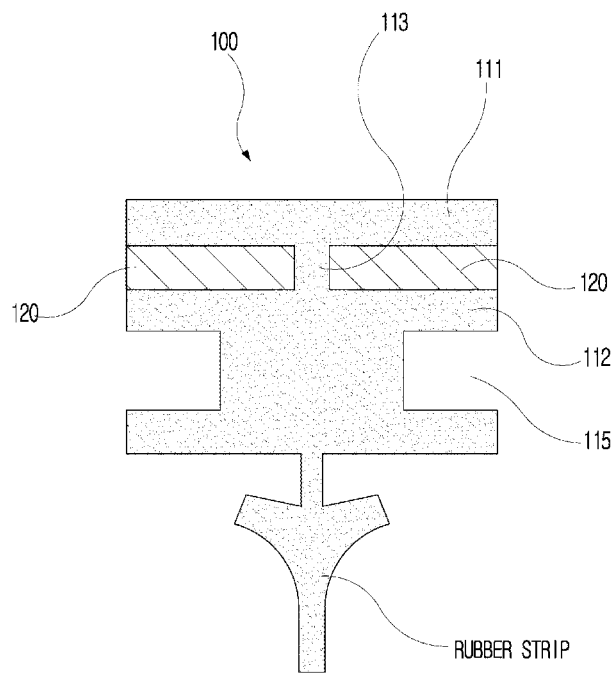
FIG. 13 is an exemplary coupled cross-sectional view of the rubber blade and the springs of the present disclosure.
Figure 14:
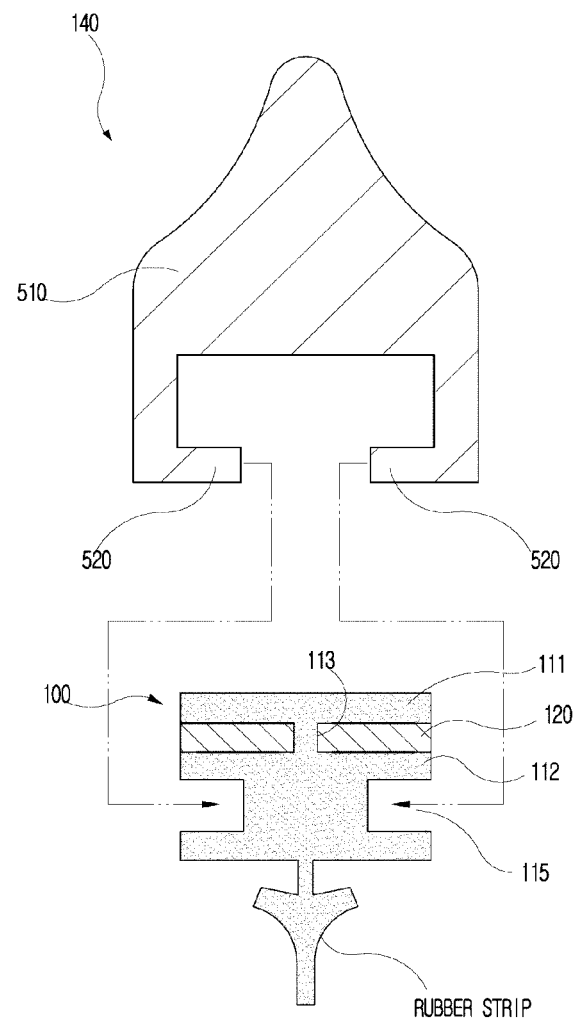
FIG. 14 is an exemplary exploded view showing the coupling of the rubber blade and the springs of the present disclosure.
Figure 15:
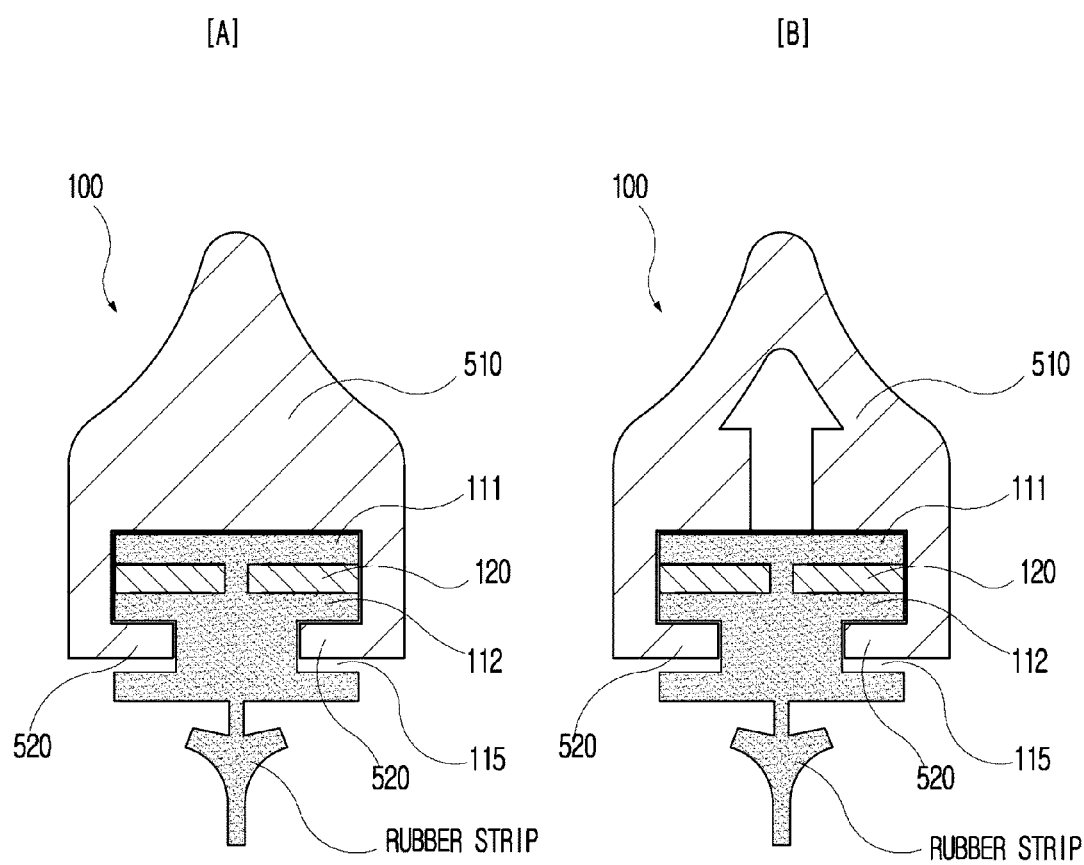
FIG. 15 is an exemplary coupled cross-sectional view of the spoiler and the rubber blade of the present disclosure.
Figure 16:
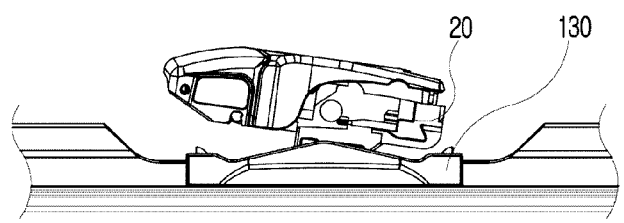
FIG. 16 is an exemplary view showing the operating state of an adapter of the present disclosure.
Figure 16:
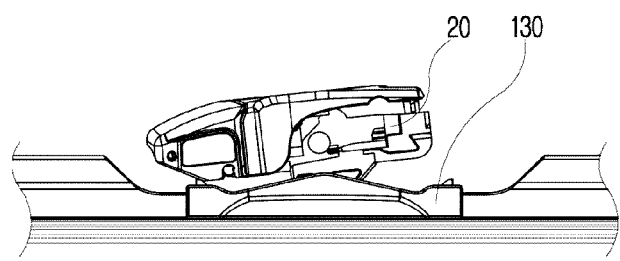
Figure 17:
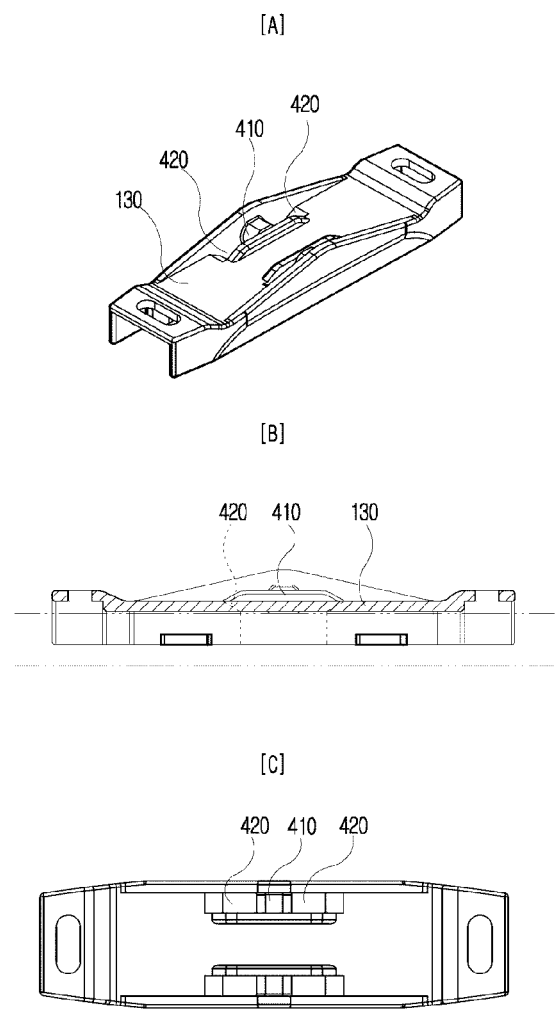
FIG. 17 is a perspective view, a side cross-sectional view, and a bottom view of the base cover of the present disclosure.
Figure 18:
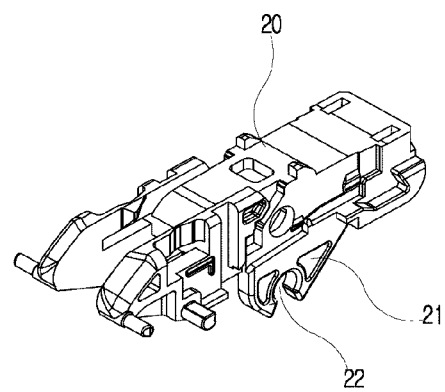
FIG. 18 is a perspective view and an exemplary front view of the adapter of the present disclosure.
Figure 18:
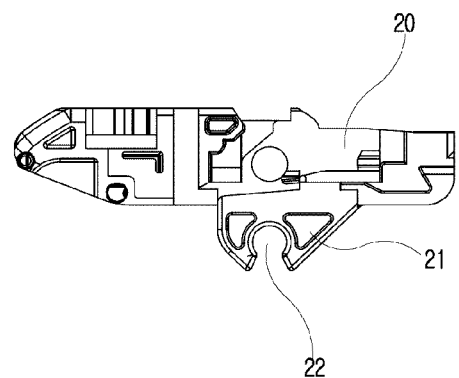
Figure 19:
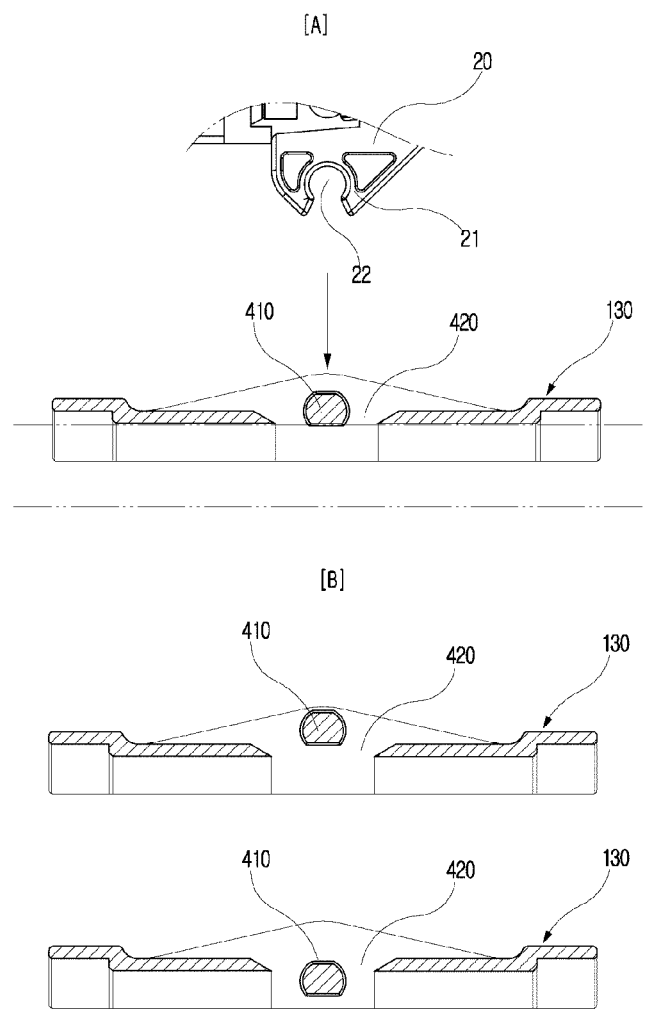
FIG. 19 is an exemplary view showing the coupling of the adapter and the base cover of the present disclosure.
Figure 20:
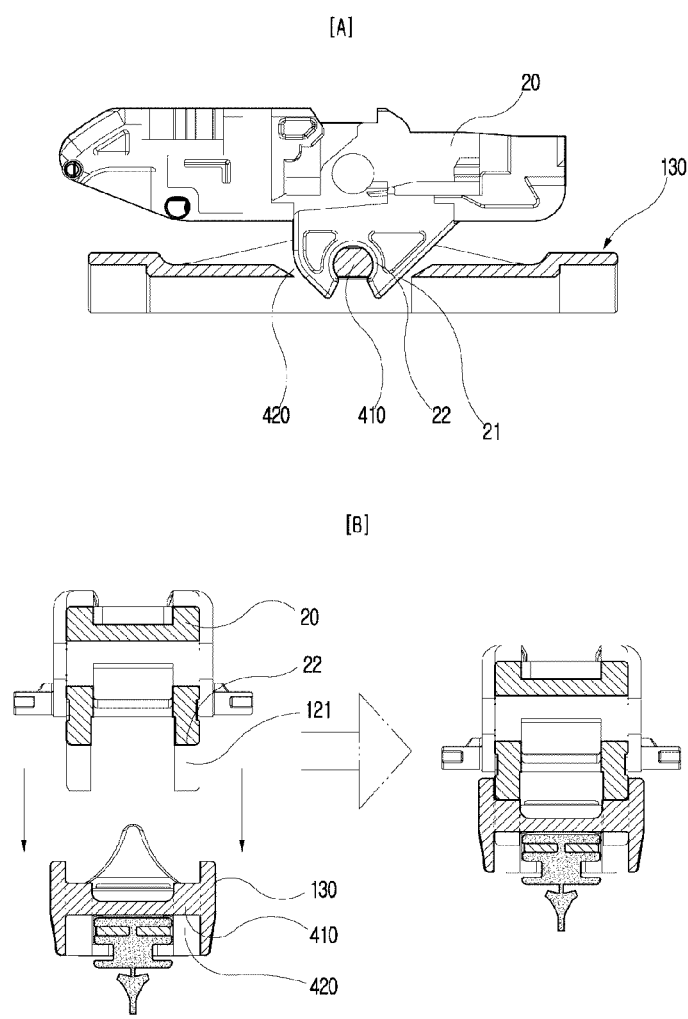
FIG. 20 is an exemplary side cross-sectional view and an exemplary coupling state diagram of the adapter of the present disclosure.
Figure 21:
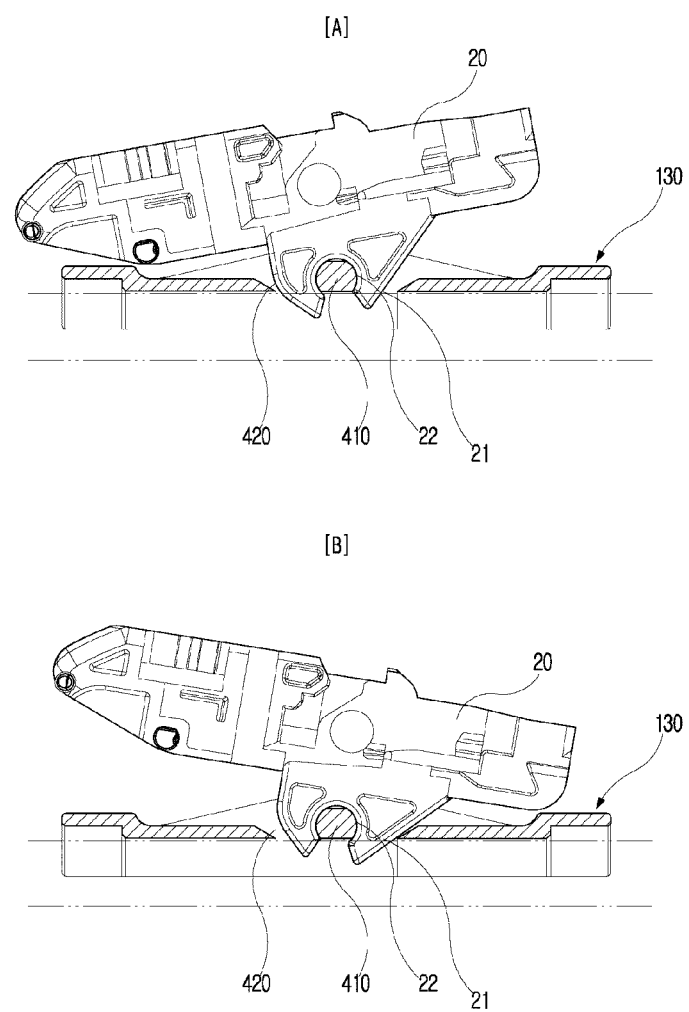
FIG. 21 is an exemplary side cross-sectional view showing the operating state of the adapter of the present disclosure.
Figure 22:
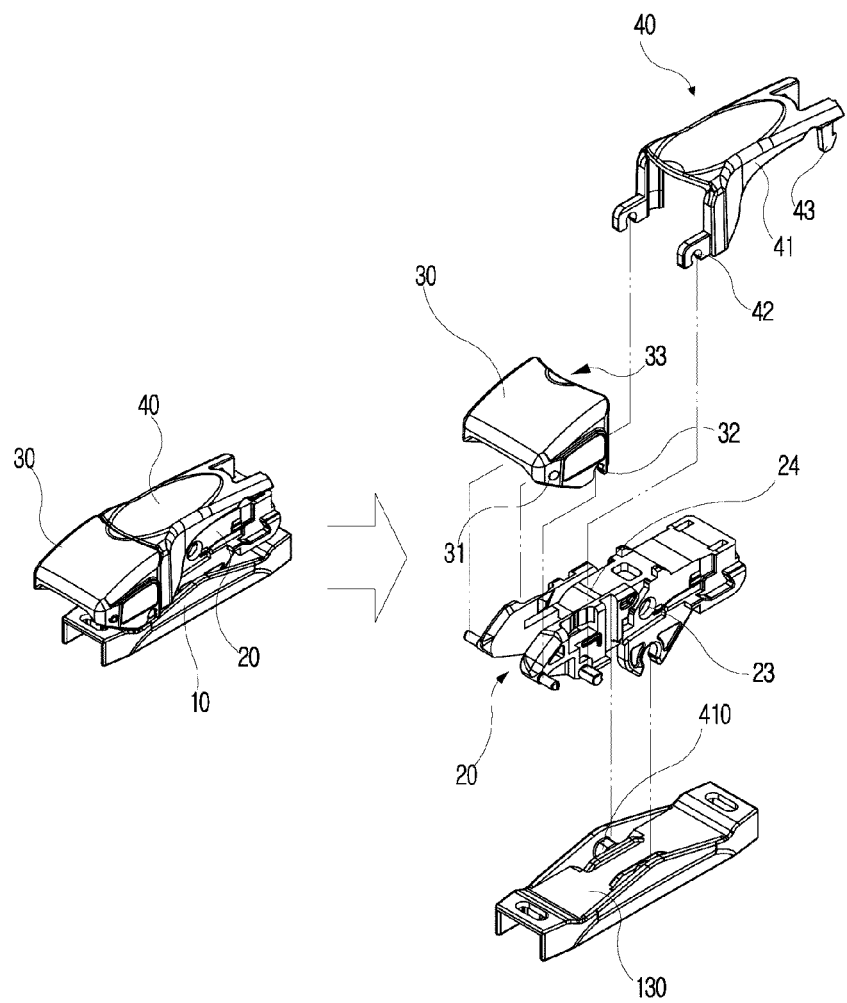
FIG. 22 is an exemplary exploded assembly view showing the adapter to which a front cap member and a rear top clip member of the present disclosure are coupled.
Figure 23:
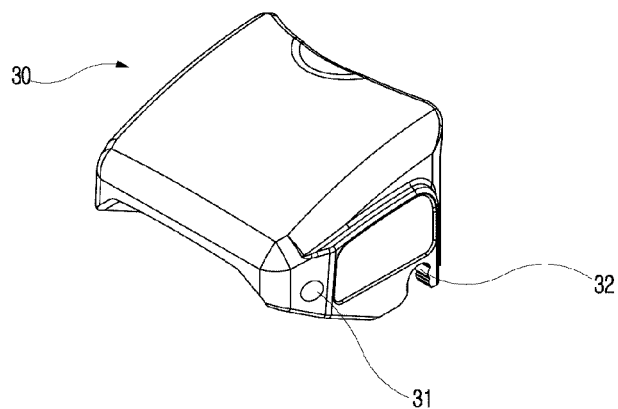
FIG. 23 is a perspective view and a side view of the front cap member of the present disclosure.
Figure 23:
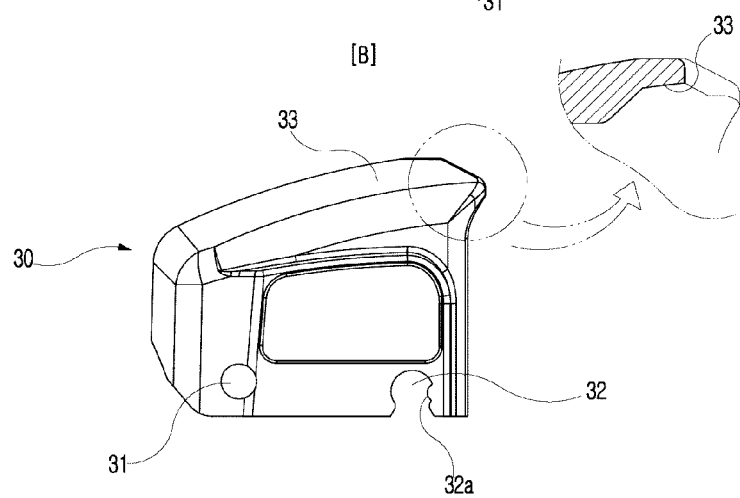
Figure 24:
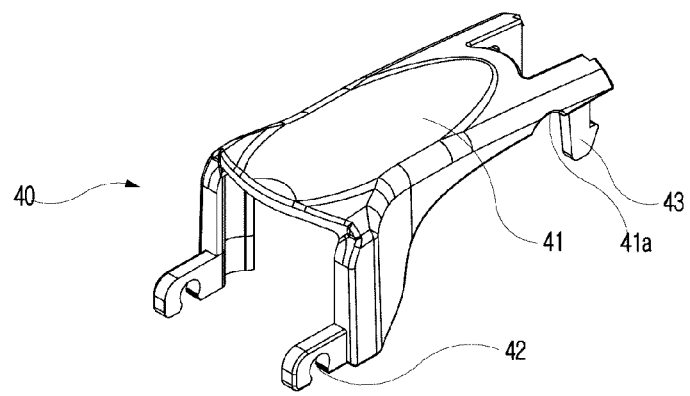
FIG. 24 is a perspective view and a side view of the top clip member of the present disclosure.
Figure 24:
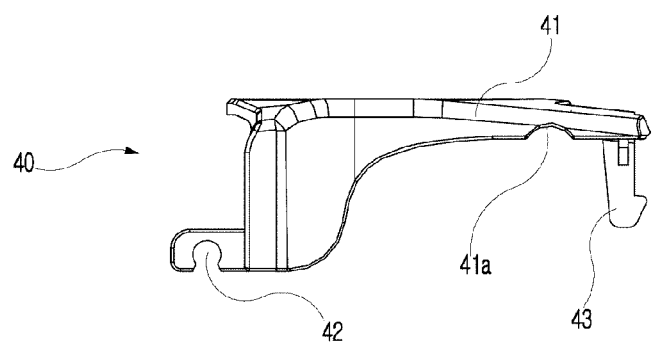
Figure 25:
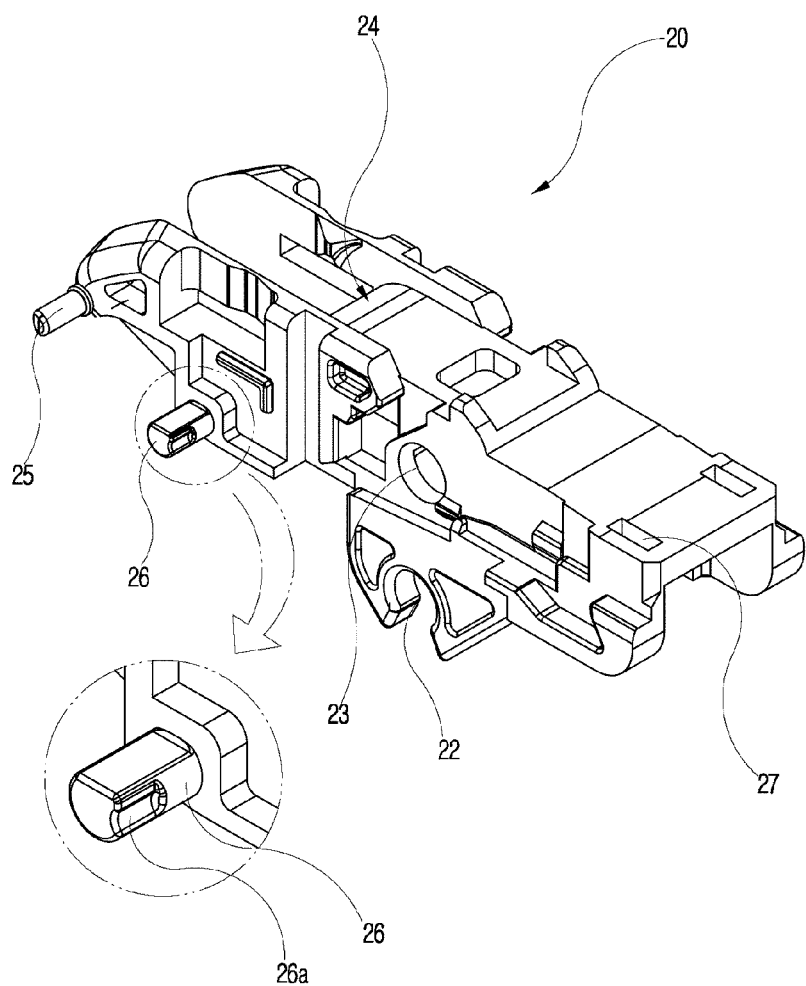
FIG. 25 is a side perspective view of the adapter of the present disclosure.
Figure 26:
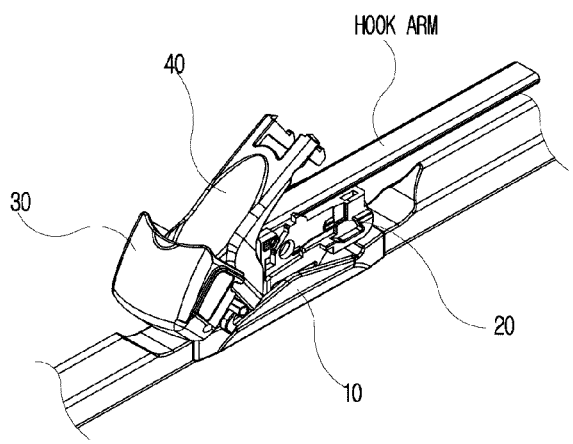
FIG. 26 is a state diagram showing the coupling of the adapter and a hook arm of the present disclosure.
Figure 26:
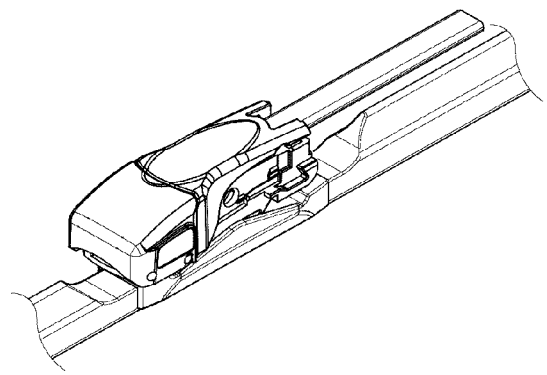
Figure 27:
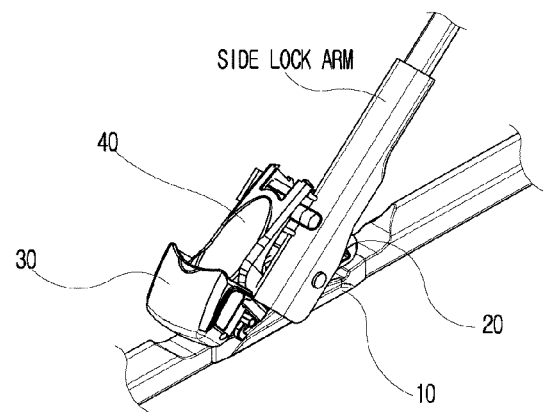
FIG. 27 is a state diagram showing the coupling of a stationary side pin arm of the present disclosure.
Figure 27:
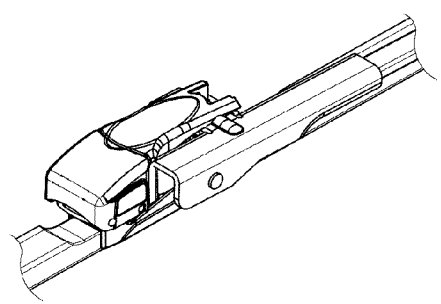

A one-touch slide assembly type wiper blade of the present disclosure will now be described in more detail with reference to the accompanying drawings.

That is, the present disclosure relates to a vehicle wiper device which can wipe off foreign matter (rainwater, snow, dust, etc.) adhering to a curvature surface of a glass window while rotating (turning) with a predetermined radius according to the operation of a user and in which rail springs 20 are coupled to an upper side of a rubber blade 100, a base cover 130 is disposed at a longitudinal center of the rubber blade 100 including the rail springs 120, and left and right spoilers 140 are assembled on left and right sides of the base cover 130, respectively, wherein the base cover 130 includes one or more "⊏"-shaped grip parts 135 formed on a bottom surface of each of a front side and a rear side of the base cover 130 and is slidingly assembled using the grip parts 135 to be freely movable in both directions;

the left and right spoilers 140 having spoiler grip parts 135 capable of gripping in a "⊏"-shape are respectively slidingly assembled on both sides of the slidingly assembled base cover 130 from both directions to determine the position of the base cover 130;

a base cover-spoiler coupling medium 210 is formed between the base cover 130 and each of the left and right spoilers 140, or a rail spring-spoiler joining medium 220 is formed between the rail springs 120 and the spoilers 140;

the spoiler grip parts 135 at both sides of each of the left and right spoilers 140 is capable of simultaneously gripping all of the spring rails 120 inserted into rail insertion grooves 110 of the rubber blade 100 and upper and lower rubber rib thicknesses 111 and 112 covering upper and lower sides of the spring rails 120;

a hinge pin 410 is formed in the base cover 130 such that when an adapter 20 is freely rotatably coupled to an upper side of the base cover 130 by a hinge, the center of a pivot of the hinge is allocated to the base cover 130;

hinge joining grooves 22 corresponding to the hinge pin 410 are formed at respective ends of hinge feet 21 protruding downward from a bottom surface of the adapter 20; and a wiper device is coupled to the upper side of the base cover 130, wherein the wiper device is provided with the arm-coupling adapter 20 whose lower part is coupled to the base cover 130 at the center by the hinge 21 so as to be freely rotatable at a predetermined angle, whose upper part has a hook arm assembling part 24 to which a hook arm is assembled, and whose central part has an arm pin assembling groove 23 penetrated in a longitudinal direction.

Hereinafter, each element and the organic coupling relationship and interaction between the elements will be described in more detail.

The rubber blade 100 is an element having a lower part made of a flexible rubber material and in close contact with a window surface of a vehicle to wipe off foreign matter. A flexible rubber strip in direct contact with the curvature surface of the window is formed at a lower side of the rubber blade 100.

An upper head H shaped to be engageable is formed at an upper side of the rubber blade 100, and the rubber insertion grooves 110 are engraved on front and rear sides of the upper head H, respectively.

Also, two rail springs 120 are inserted into the rail insertion grooves 110 at both ends of the upper side of the rubber blade 100, respectively. The rail springs 120 have an elongated shape and are made of a rigid metal material. Thus, the rail springs 120 have considerable rigidity and elasticity as well as bearing power (to serve as the framework of a structure).

In addition, the base cover 130 is assembled at an upper center of the rubber blade 100 into which the rail springs 120 are inserted. The base cover 130 is a medium for providing a base for joining an adapter (a part for coupling an arm).

The base cover 130 is molded by integrated injection of a lightweight and inexpensive synthetic resin. Since one or more pairs of "⊏"-shaped grip parts 135 are formed on a bottom surface of the base cover 130, the base cover 130 can be quickly and easily assembled by a quick one-touch sliding operation.

Also, the left and right spoilers 140 are assembled on both sides of the base cover 130, respectively. The left and right spoilers 140 have an asymmetrical shape to prevent a lifting or floating phenomenon by generating drag against wind pressure accompanied by high-speed driving of the vehicle.

For the sake of convenience, one end of each of the left and right spoilers 140 which contacts the base cover 130 is referred to as a base connection part 143, and the other end which corresponds to the exterior of an outer portion is referred to as a spoiler one side finishing part 144.

A grip-type slide joining groove 142 is formed in a bottom surface between the base connection part 143 and the spoiler one side finishing part 144. The grip-type slide joining groove 142 may be slid into the upper head 111 of the rubber blade 110 and then grip the upper head 111 of the rubber blade 110.

The grip-type slide joining groove 142 is open on the side of the base connection part 143, but closed on the side of the spoiler one side finishing part 144.

The left and right spoilers 140 are integrally injection-molded using a synthetic resin having elasticity and flexibility such as rubber.

<Base Cover>

The base cover 130 is set at the upper center of the rubber blade 110 into which the rail springs 120 are inserted as described above.

In this state, the base cover 130 provides a base for easy coupling of an adapter which is a part for joining an arm.

While a conventional base cover is manufactured using a metal material and fixed (non-detachable) with difficulty through a press pressurization process, the base cover 130 according to the present disclosure is integrally manufactured by injection molding of a lightweight and inexpensive synthetic resin.

In particular, since one or more pairs of "⊏"-shaped grip parts 135 formed on the bottom surface of the base cover 130 enable the base cover 130 to be assembled quickly and easily by a one-touch sliding operation, they greatly contribute to ease of assembly, productivity improvement, and cost reduction.

Above all, the back cover 130 is assembled by a very simple and quick one-touch sliding method, unlike the conventional back cover which is completely fixed to be non-detachable. Therefore, the back cover 130 is very meaningful in that it can move freely to the left and right before being coupled to the left and right spoilers 140.

That is, the base cover 130 can be very easily and quickly inserted and assembled by a one-touch sliding method using the "⊏"-shaped grip parts 135. If necessary, the size of the "⊏"-shaped grip parts 135 may be adjusted such that the "⊏"-shaped grip parts 135 are uniformly press fit to avoid arbitrary movement.

Regardless of this, the left and right spoilers 140 are coupled to the left and right sides of the base cover 130, respectively. Accordingly, the base cover 130 is naturally moved toward the center to settle at that position.

Further, connection grooves 131 are formed at both sides of the base cover 130. The connection grooves 131 are formed to be larger than the base connection parts 143 of the left and right spoilers 140 such that the base connection parts 143 can be stably inserted into the connection grooves 131.

<Left and Right Spoilers>

The left and right spoilers 140 are assembled on the left and right sides of the base cover 130, respectively, and have an asymmetrical shape to prevent a lifting or floating phenomenon by generating drag against wind pressure accompanied by high-speed driving of the vehicle.

Any one of left and right sides of each of the left and right spoilers 140 is a part that contacts the base cover 130 located at the center and is thus referred to as the base connection part 143, and an end of the other side is a part that forms the exterior of an outer portion of each of the left and right spoilers 140 and is thus referred to as the spoiler one side finishing part 144.

Here, as described above, the grip-type slide joining groove 142 is formed in the bottom surface between the base connection part 143 and the spoiler one side finishing part 144. The grip-type slide joining groove 142 may be inserted into the upper head H of the rubber blade 100.

After being inserted, the grip-type slide joining groove 142 may effectively grip the upper head H of the rubber blade 100. To this end, the grip-type slide joining groove 142 may be formed in a "⊏" shape and have a long length.

The grip-type slide joining groove 142 is structured to be open on the side of the base connection part 143 and to be closed on the side of the spoiler one side finishing part 144 which is opposite to the side of the base connection part 143.

Therefore, the left and right spoilers 140 can be respectively assembled to the upper head 111 of the rubber blade 110 on the left and right sides of the base cover 130 by a quick and simple one-touch sliding method.

<Base Cover-Spoiler Coupling Medium and Rail Spring-Spoiler Joining Medium>

Further, any one or more of the base cover-spoiler coupling medium 210 and the rail spring-spoiler joining medium 220 may be installed. The base cover-spoiler coupling medium 210 is formed between the base cover 130 and each of the left and right spoilers 140 respectively corresponding to both sides of the base cover 130 to enable the base cover 130 and each of the left and right spoilers 140 to be caught on each other.

In addition, the rail spring-spoiler joining medium 220 is formed between both ends of the rail springs 120 and the spoiler one side finishing parts 144 of the left and right spoilers 140 which correspond to the both ends of the rail springs 120 to enable the rail springs 120 and the left and right spoilers 140 to be fitted into each other.

Here, the base cover-spoiler coupling medium 210 may be designed to have a groove 211 and a protrusion 212 respectively formed on an inner surface of each of the connection grooves 131 of the base cover 130 and an outer surface of each of the left and right spoilers 140 which contacts the inner surface of each of the connection grooves 131. The groove 211 and the protrusion 212 are elastically caught on each other in a male-female structure. Alternatively, the base cover-spoiler coupling medium 210 may be designed to have a catching hole 221 and a catching protrusion 222 which are caught on each other in a male-female structure.

On the other hand, the rail spring-spoiler joining medium 220 includes rail end protrusions 121, which protrude further than both ends of the rubber blade 110, at both ends of the rail springs 120 coupled to the rubber blade 110.

In addition, the rail spring-spoiler joining medium 220 includes rail end joining grooves 145 formed in the spoiler one side finishing parts 144 of the left and right spoilers 140 which correspond to the rail end protrusions 121 at both ends of the rail springs 120. The rail end protrusions 121 may be inserted into the rail end joining grooves 145 by interference fit.

Further, the rail end joining grooves 145 and the rail end protrusions 121 may be more firmly attached to each other by interference fit with a strong adhesive (not illustrated).

If any one or more of the base cover-spoiler coupling medium 210 and the rail spring-spoiler joining medium 220 is applied, the left and right spoilers 140 are caught on the base cover 130 or the rail springs 120 and thus prevented from being detached in a lateral direction. Therefore, although the left and right spoilers 140 are assembled by a simple one-touch sliding method, they can maintain a sufficient organic coupling relationship with the base cover 130 or the rail springs 120.

Further, if irregularities 121a are additionally formed on each of the rail end protrusions 121 of the rail springs 120, which are coupled to the rail end joining grooves 145 by interference fit, using a press striking process, a binding force between the rail end joining grooves 145 and the rail end protrusions 121 can be further strengthened.

In this configuration, when the base cover 130 is assembled at the center of the rubber blade 110 including the rail springs 120, it may not be coupled with difficulty by a pressurization process using a press. Instead, the base cover 130 may be very easily inserted into the upper head 111 of the rubber blade 110 by a one-touch sliding operation and then maintain a stable grip state.

The left and right spoilers may also be coupled to the rubber blade 110 including the rail springs 120 in both directions with respect to the base cover 130 by a quick and simple one-touch sliding operation and then maintain a grip state. In particular, since the organic coupling (assembly) relationship between the base cover 130 and the left and right spoilers 140 can be completed only by each simple one-touch assembling operation, the speed and convenience of wiper manufacture and assembly can be greatly increased, and costs can be sharply reduced.

In addition, each of the left and right spoilers 140 includes a spoiler body 510 at an upper side. The spoiler body 510 has a substantially triangular symmetric or asymmetric shape in order not to be lifted up by air pressure created during high-speed driving of the vehicle. The spoiler grip parts 135 are formed below both ends of the spoiler body 510. The spoiler grip parts 135 may grip, in a " ⊏ " shape, all of the spring rails 120 inserted into the rail insertion grooves 110 of the rubber blade 100 and the upper and lower rubber rib thicknesses 111 and 112 covering upper and lower sides of the spring rails 120.

If the rail insertion grooves 110 are respectively formed at both sides of the upper end of the rubber blade 100, a middle connection piece 113 may be formed between the rail insertion grooves 110 to define the rail insertion grooves 110 at both sides while connecting the lower part made of a rubber material to an upper part.

The middle connection piece 113 may have a very small width corresponding to about 5 to 10% of the entire width of the rubber blade 100 in order to maximize the width of each of the rail insertion grooves 110 formed on both sides of the middle connection piece 113. Accordingly, wider spring rails 120 may be inserted into the rail insertion grooves 110.

If the wider spring rails 120 are inserted into the rail insertion grooves 110, the rigidity and bearing power of the spring rails 120 which serve as a frame for holding the entire skeleton of the wiper may be further increased, and the increased rigidity and bearing power may greatly improve functionality for shape retention against gentle curvature formed on the spring rails 120, thereby providing various benefits and reliability.

In addition, when the anti-lift spoilers 140 are coupled to the upper side of the rubber blade 100 having the two relatively wide spring rails 120 inserted into the rail insertion grooves 110 at both sides, they are not fitted directly to both sides of the spring rails as in the conventional art. Instead, the spoilers 140 are coupled to the rubber blade 100 in such a manner that the spoiler grip parts 135 respectively formed below both ends of the spoiler body 510 are inserted into latching grooves 115 formed at both ends below the lower rubber rib thickness 122. Here, the spoiler grip parts 135 may simultaneously grip all of the spring rails 120 inserted into the rail insertion grooves 110 of the rubber blade 100 and the upper and lower rubber rib thicknesses 111 and 112 covering the upper and lower sides of the spring rails 120.

Therefore, since far more stable and secure coupling than before is possible, the performance and quality of the wiper can be greatly improved.

In addition, although the anti-lift spoilers 140 are molded using a soft rubber material, the spoiler grip parts 135 which cover and grip, in a " ⊏ " shape, the whole of the upper and lower rubber rib thicknesses 111 and 112 covering the upper and lower sides of the spring rails 120 are integrally and continuously formed to a length equal to the length of the anti-lift spoilers 140.

Therefore, when the spoiler grip parts 135 simultaneously cover, in a " ⊏ " shape, the whole of the upper and lower rubber rib thicknesses 111 and 112 covering the upper and lower sides of the spring rails 120, they may provide a very strong and stable binding force because they correspond to not a partial, but entire length of the whole.

Furthermore, the spoiler grip parts 135 covering and gripping the upper and lower rubber rib thicknesses 111 and 112 are brought into close contact with the upper and lower rubber rib thicknesses 111 and 112 of the rubber blade 100 which are made of a high-friction and elastic material.

Coupling through the close contact itself provides considerable stability, that is, prevents unstable shaking or vibration even during rotation of the wiper.

Referring to FIGS. 16 through 21, the hinge pin 410 is formed in the base cover 130 such that when the adapter 20 is freely rotatably coupled to the upper side of the base cover 130 by a hinge, the center of a pivot of the hinge is allocated to the base cover 130. In addition, hinge joining grooves 22 corresponding to the hinge pin 410 are formed at respective ends of hinge feet 21 protruding downward from the bottom surface of the adapter 20.

Therefore, the adapter 20 may be hinge-coupled to the base cover 130 by two protruding hinge feet 21 formed at its lower side. Since the hinge pin 410 is located in the base cover 130, a central point of the pivot (hinge pin) that is rotated when the adapter 20 and the base cover 130 are coupled by the hinge may be formed at a position as low as possible.

If the center of the pivot (hinge pin) rotated by the hinge is formed at the lowest possible position, the height of the adapter 20 may be reduced compared with that in the conventional art. Accordingly, this can more effectively ensure the stability of posture and assembly, for example, minimize a vertical height of the whole of the base cover 130 and the adapter 20 assembled together.

Furthermore, since a core element (hinge pin) necessary for the operation of the hinge is formed not in the complicated adapter 20, but in the simple-structured base cover 130, the adapter 20 and the base cover 20 can be designed and manufactured more easily due to the distribution effect of elements. Also, when another function is additionally applied to the adapter 20, a space for the function can be secured more easily. In particular, since the center of the pivot (hinge pin) on which the hinge rotates is formed on the base cover 130 under the adapter 20, significant benefits are offered. For example, it is very advantageous in a design for increasing the freedom and radius of rotation required for the adapter 20.

The central point of the hinge pin 410 formed in the base cover 130 may be positioned at the same height as an upper surface of the base cover 130 or may be positioned higher or lower than the upper surface of the base cover 130 within a range that does not exceed a diameter of the hinge pin 410.

That is, if the hinge pin 410 is formed too high at a distance exceeding the diameter of the hinge pin 410 from the upper surface of the base cover, it damages the original technical idea that the hinge pin 410 should be formed as low as possible toward the base cover 130. If the hinge pin 410 is formed too low at a distance exceeding the diameter of the hinge pin 410 from the upper surface of the base cover 130, a distance between the position where the hinge pin 410 is rotated and the upper surface of the base cover 130 is greatly increased, and the lengths of the hinge feet 21 at the lower side of the adapter 20 should also be increased by the increased distance, which may bring about an adverse effect.

In addition, rotation operation grooves 420 should be formed in the base cover 130 in front of and behind the hinge pin 410 so as to secure a molding space necessary for clearly forming the hinge pin 410 and a space necessary for smooth rotation of the hinge feet 21 inserted into the rotation operation grooves 420.

Here, the rotation operation grooves 420 may be formed large enough to accommodate the hinge feet 21 of the adapter 20 which are inserted into the rotation operation grooves 420 and to secure a sufficient space required for the rotation of the hinge feet 21.

In addition, the hinge pin 410 provided in the lower base cover 130 is molded integrally during injection molding of the base cover 130. Therefore, the hinge pin 410 does not cause problems such as productivity reduction and cost increase.

Also, since the hinge joining grooves 22 engaged with the hinge pin 410 are formed in the hinge feet 21 protruding downward from the bottom surface of the adapter 20, the adapter and the base cover 130 under the adapter can be easily assembled together by the hinge feet 21.

Further, referring to FIGS. 22 through 28, the arm-coupling adapter 20 is installed on the upper side of the base cover 130. The lower part of the arm-coupling adapter 20 is coupled to the base cover 130 by the hinge 410 such that it can freely rotate at a predetermined angle. The hook arm assembling part 24 to which a hook arm is assembled is formed in the upper part of the arm-coupling adapter 20. In addition, the arm pin assembling groove 23 penetrates the central part of the arm-coupling adapter 20 in the longitudinal direction.

A rear top clip member 40 may be additionally assembled on a rear side of the arm-coupling adapter 20 to partially cover a rear part of the adapter 20 and, at the same time, to prevent detachment of the hook arm or a side lock arm and secure stable posture of the arm by uniformly pressing the arm when the arm is coupled.

Figure 29:
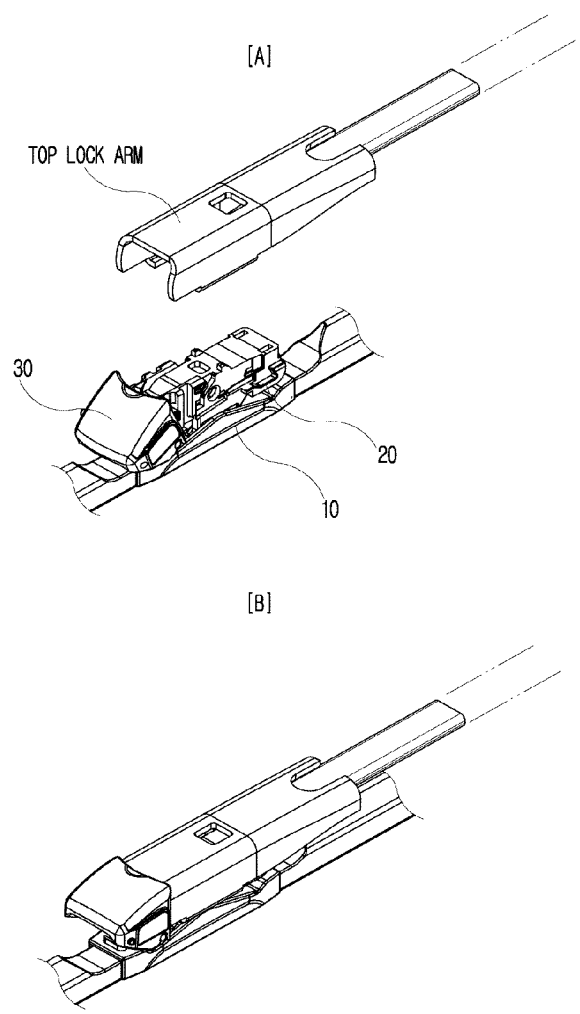
FIG. 29 is a state diagram showing the coupling of a top lock arm of the present disclosure.

In addition, a front cap member 30 may further be provided on a front side of the arm-coupling adapter 20 to cover a front part of the adapter and, at the same time, to prevent detachment of a pinch tap arm by pressing an end of an upper side of the pinch tap arm when the pinch tap arm is coupled as illustrated in FIG. 29.

The front cap member 30 has a generally cap-like shape, and hinge coupling grooves 31 coupled to the hinge pin 410 for enabling free rotation are formed at one side of the front cap member 30.

In addition, detachable joining grooves 32 which can be attached or detached by being pushed or pulled with a certain force are formed at another side kept at a predetermined distance from the hinge coupling grooves 31.

A push part 33 is formed inwardly in a central part of an upper side of the front cap member 30 to prevent detachment of the pinch tap arm by pressing an end of the upper side of the pinch tap arm with a certain force when the pinch tap arm is coupled.

Figure 28:
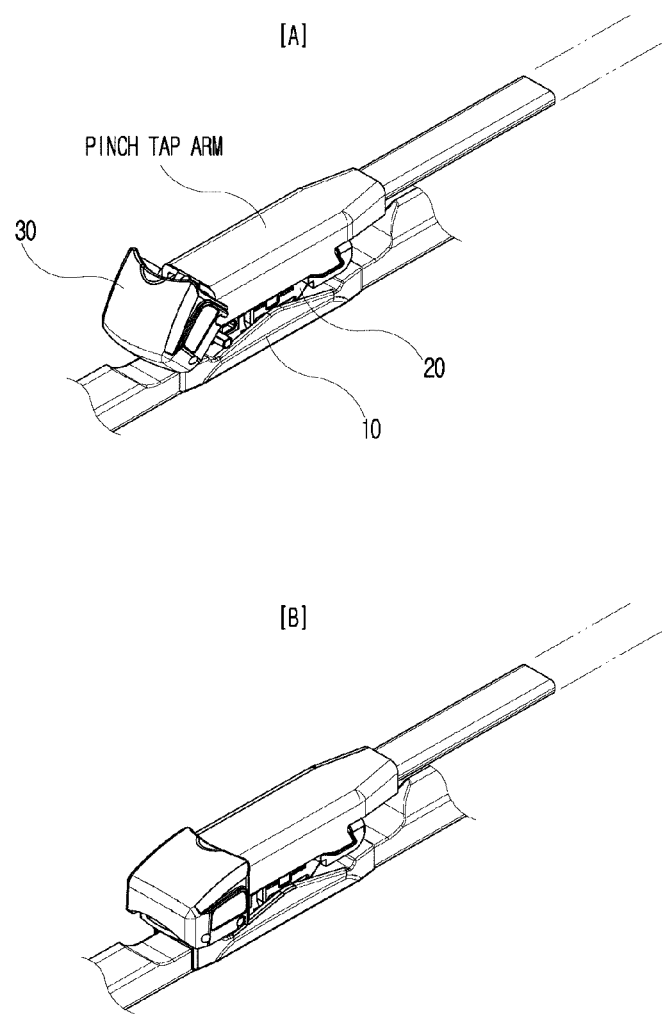
FIG. 28 is a state diagram showing the coupling of a hook arm of the present disclosure.

In addition, the rear top clip member 40 assembled on the rear side has, in an upper part, a top cover part 41 which covers a portion of an upper surface of a rear part of the adapter 20 and includes a touch part 41a pressing down on the side lock arm as illustrated in FIG. 28 to prevent detachment of the side lock arm.

Also, hinge coupling grooves 42 coupled to the hinge pin for enabling free rotation are formed under a front side of the top cover part 41, and detachable joining protrusions 43 which can be easily attached or detached by being pushed or pulled with a certain force are formed at another side kept at a predetermined distance from the hinge coupling grooves 42.

In addition, insertion grooves 20a are engraved in a vertical direction on both sides of the front side of the arm-coupling adapter 20, front locking protrusions 20b are formed immediately behind lower ends of the insertion grooves 20a, and rear locking protrusions 20c protruding further outward are formed behind the front locking protrusions 20b at a predetermined distance from the front locking protrusions 20b.

Referring to FIG. 30, a narrow locking part T-1 protruding inward from a side of a top lock arm is inserted down into the insertion groove 20a. Then, when the narrow locking part T-1 is pulled rearward, it is caught on the front locking protrusion 20*b* and thus prevented from being detached. On the other hand, a wide locking part T-2 on the opposite of the top lock arm is pulled downward without being inserted into the insertion groove 20*a*. Then, when the wide locking part T-2 is pulled rearward, a rear end of the wide locking part T-2 is caught on the rear locking protrusion 20*c* and thus prevented from being detached. In this way, the top lock arm can also be easily coupled.

In addition, front cap hinge pins 25 protrude from a lower part of the front side of the arm-coupling adapter 20, hinge and joining pins 26 are formed at one end located a predetermined distance behind the front cap hinge pins 25, and detachable joining grooves 27 to which the detachable joining protrusions 32 can be elastically coupled are formed in the upper surface of the rear side of the arm-coupling adapter 20.

In addition, an auxiliary locking groove 26*a* may be additionally formed on an outer side of each of the hinge and joining pins 26 so as to provide a more secure binding force when the detachable joining grooves 32 are coupled, and an auxiliary locking protrusion 32*a* may be additionally formed at a side of each of the detachable joining grooves 32 corresponding to the auxiliary locking grooves 26*a*.

SEQUENCE LIST FREE TEXT

| | |
|---|---|
| 30: grip part | 100: rubber blade |
| 120: rail spring | 130: base cover |
| 140: left and right spoilers | |

The invention claimed is:

1. A one-touch slide assembly wiper blade comprising:
rail springs coupled to an upper side of a rubber blade;
a base cover disposed at a longitudinal center of the rubber blade, wherein the base cover comprises one or more grip parts formed on a bottom surface of each of a front side and a rear side of the base cover, wherein the base cover is slidingly assembled using the grip parts, and wherein the grip parts are bidirectionally movable; and
left and right spoilers assembled on left and right sides of the base cover, respectively, wherein the left and right spoilers have spoiler grip parts respectively slidingly assembled on both sides of the slidingly assembled base cover from both directions to determine the position of the base cover;
one or more coupling mechanism selected from the group consisting of a base cover-spoiler coupling mechanism formed between the base cover and each of the left and right spoilers, and a rail spring-spoiler joining mechanism formed between the rail springs and the spoilers, wherein the spoiler grip parts at both sides of each of the left and right spoilers grip the rail springs, which are inserted into rail insertion grooves of the rubber blade, and also grip upper and lower rubber rib thicknesses, which cover upper and lower sides of the rail springs, and wherein portions of the rail springs and portions of the upper and lower rubber rib thicknesses are disposed between one of the spoiler grip parts and an inner-upper surfaces of the spoilers, and the inner-upper surfaces are facing the spoiler grip parts;
a hinge pin formed in the base cover such that when an adapter is freely rotatably coupled to an upper side of the base cover by a hinge, a center of a pivot of the hinge is allocated to the base cover;
hinge joining grooves corresponding to the hinge pin formed at respective ends of hinge feet protruding downward from a bottom surface of the adapter; and
a wiper device coupled to the upper side of the base cover, wherein the wiper device is provided with the adapter whose lower part is coupled to the base cover at the center by the hinge so as to be freely rotatable at a predetermined angle, whose upper part has a hook arm assembling part to which a hook arm is assembled, and whose central part has an arm pin assembling groove penetrated in a longitudinal direction,
wherein front cap hinge pins protrude from a lower part of a front side of the adapter, hinge and joining pins are formed at one end located a predetermined distance behind the front cap hinge pins, and detachable joining grooves to which detachable joining protrusions can be elastically coupled are formed in an upper surface of a rear side of the adapter, and
wherein an auxiliary locking groove is additionally formed on an outer side of each of the hinge and joining pins so as to provide a secure binding force when detachable joining grooves of a front cap member are coupled, and an auxiliary locking protrusion is further formed at a side of each of the detachable joining grooves of the front cap member corresponding to the auxiliary locking grooves.

2. The one-touch slide assembly wiper blade of claim 1, wherein a rear top clip member is additionally assembled on a rear side of the adapter to partially cover a rear part of the adapter and to uniformly press down on the hook arm or a side lock arm so as to prevent detachment of the arm and secure stable posture of the arm when the arm is coupled.

3. The one-touch slide assembly wiper blade of claim 2, wherein each of the rail spring-spoiler joining mechanism formed between the rail springs and the left spoiler and the rail spring-spoiler joining mechanism formed between the rail springs and the right spoilers comprises rail end protrusions, which protrude further than both ends of the rubber blade, at both ends of the rail springs coupled to the rubber blade and rail end joining grooves which are formed in spoiler one side finishing parts of the left and right spoilers which correspond to the rail end protrusions at both ends of the rail springs, wherein the rail end protrusions are inserted into the rail end joining grooves by interference fit.

4. The one-touch slide assembly wiper blade of claim 3, wherein irregularities are additionally formed on each of the rail end protrusions of the rail springs, which are coupled to the rail end joining grooves by interference fit, using a press striking process.

5. The one-touch slide assembly wiper blade of claim 3, wherein an adhesive is optionally applied when the rail end joining grooves and the rail end protrusions are attached to each other by interference fit.

6. The one-touch slide assembly wiper blade of claim 2, wherein the rear top clip member assembled on the rear side comprises:
a top cover part which covers a portion of an upper surface of the rear part of the adapter and comprises a touch part configured to press down on a holder part of the side lock arm when the side lock arm is coupled with the adapter, to prevent detachment of the side lock arm;
hinge coupling grooves which are coupled to hinge pins formed in the adapter and configured to enable free rotation of the hinge pins;

detachable joining protrusions which are configured to be attached or detached by being pushed or pulled with a certain force.

7. The one-touch slide assembly wiper blade of claim 1, wherein connection grooves are formed at both sides of the base cover to be larger than base connection parts of the left and right spoilers such that the base connection parts can be stably inserted into the connection grooves.

8. The one-touch slide assembly wiper blade of claim 7, wherein each of the base cover-spoiler coupling mechanism formed between the base cover and the left spoilers and the base cover-spoiler coupling mechanism formed between the base cover and the right spoilers is structured to have a groove and a protrusion respectively formed on an inner surface of each of the connection grooves of the base cover and an outer surface of each of the left and right spoilers which contacts the inner surface of each of the connection grooves such that the groove and the protrusion are elastically caught on each other in a male-female structure or is structured to have a catching hole and a catching protrusion which are caught on each other in a male-female structure.

9. The one-touch slide assembly wiper blade of claim 1, wherein a middle connection piece is formed between the rail insertion grooves respectively formed at both sides of an upper end of the rubber blade and has a small width corresponding to about 5 to 10% of the entire width of the rubber blade.

10. The one-touch slide assembly wiper blade of claim 1, wherein the rail springs respectively inserted into the rail insertion grooves have a large width corresponding to about 90 to 95% of the entire width of the rubber blade.

11. The one-touch slide assembly wiper blade of claim 1, wherein the spoilers are integrally injection-molded using a soft rubber material, and the spoiler grip parts are continuously formed to a length equal to a length of a spoiler body.

12. The one-touch slide assembly wiper blade of claim 1, wherein a central point of the hinge pin formed in the base cover is positioned at the same height as an upper surface of the base cover or is positioned higher or lower than the upper surface of the base cover within a range that does not exceed a diameter of the hinge pin.

13. The one-touch slide assembly wiper blade of claim 1, wherein rotation operation grooves are formed in the base cover in front of and behind the hinge pin to secure a molding space of the hinge pin and a space necessary for rotation of the hinge feet inserted into the rotation operation grooves.

14. The one-touch slide assembly wiper blade of claim 1, wherein the hinge pin provided in the base cover is molded integrally during injection molding of the base cover.

15. The one-touch slide assembly wiper blade of claim 1, wherein the front cap member is further provided on a front side of the adapter to cover a front part of the adapter and, at the same time, prevent detachment of a pinch tap arm by pressing an end of an upper side of the pinch tap arm when the pinch tap arm is coupled, wherein the front cap member has a cap shape, hinge coupling grooves coupled to hinge pins formed in the adapter, for enabling free rotation, are formed at one side of the front cap member, detachable joining grooves which can be attached or detached by being pushed or pulled with a certain force are formed at another side kept at a predetermined distance from the hinge coupling grooves, and a push part is formed inwardly in a central part of an upper side of the front cap member to prevent detachment of the pinch tap arm by pressing the end of the upper side of the pinch tap arm with a certain force when the pinch tap arm is coupled.

\* \* \* \* \*